June 27, 1933.  C. G. JANSON  1,915,275
BEARING
Filed Sept. 4, 1930
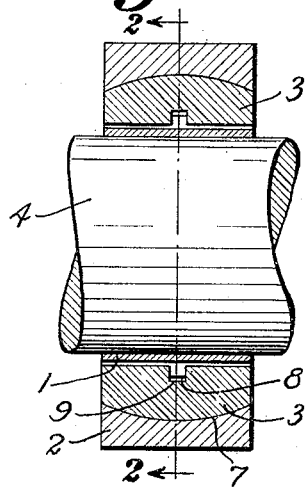
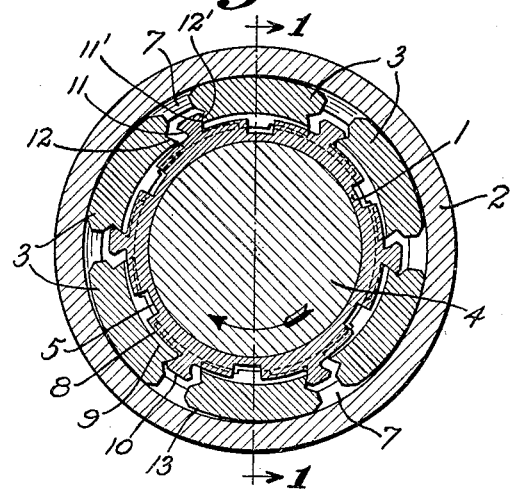
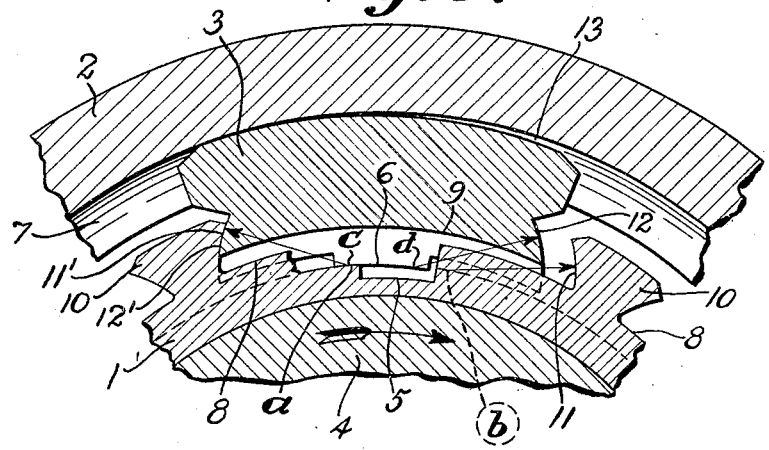
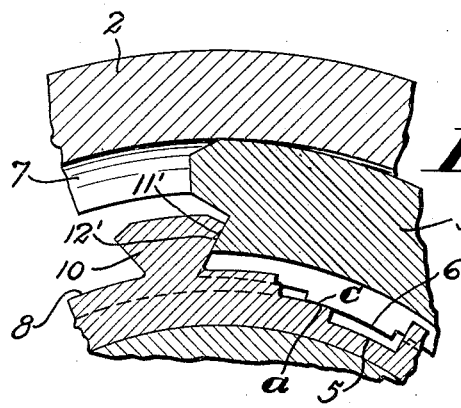

Patented June 27, 1933

1,915,275

UNITED STATES PATENT OFFICE

CARL GUSTAF JANSON, OF STOCKHOLM, SWEDEN, ASSIGNOR TO AKTIEBOLAGET NOMY, OF STOCKHOLM, SWEDEN, A CORPORATION OF SWEDEN

BEARING

Application filed September 4, 1930, Serial No. 479,621, and in Sweden September 14, 1929.

The present invention relates to bearings of the type employing a plurality of bearing blocks.

The present invention relates more particularly to radial bearings of the type in which bearing blocks radially positioned between inner and outer bearing members automatically adjust themselves upon rotation of the bearing so that a wedge-shaped space is formed between the bearing blocks and the surface of one of the members, with which they are in sliding contact, said wedge-shaped space being filled by a load sustaining film of lubricant.

In bearings of this character, as to which reference may be had, but without limitation, to Wallgren U. S. Pat. No. 1,871,485, granted August 16, 1932, the blocks are rotated with the other of the bearing members, which may conveniently be termed a driving member, through the medium of abutments formed on the driving member.

Furthermore, there is a certain amount of radial play of the blocks between the bearing members, this play permitting the blocks to tilt at different angles as they automatically adjust their position in accordance with variations in load conditions. As the bearing blocks are rotated, they pass from load bearing zones to non-load bearing zones and vice versa, and, as the load on individual blocks varies, the angle at which the block is tilted also varies.

In prior forms of bearings of the character described, this alteration in the angle of tilt of the blocks has resulted in relative peripheral movement between the radial load carrying bearing surfaces on the blocks and on the driving member, which movement has resulted in undesirable wear on these surfaces.

The general object of the present invention is to improve upon the construction of bearings of the above mentioned character to substantially eliminate this relative peripheral movement between the cooperating radial load carrying bearing surfaces on the blocks and the driving member, due to changes in the angle of tilt assumed by the bearing blocks. This general object is attained by forming the abutment surfaces on the driving member and the cooperating surfaces on the blocks so that the angle of tilt of the blocks may be altered by a substantially pivotal movement of the blocks about their radial load carrying bearing surfaces as centers.

The nature of the invention and its more specific objects may best be understood from the following description of the forms of bearing embodying the invention illustrated in the accompanying drawing, in which Fig. 1 is a longitudinal central section of a bearing embodying the invention, taken on the line 1—1 of Fig. 2;

Fig. 2 is a transverse section of the bearing shown in Fig. 1, taken in the line 2—2 of Fig. 1;

Fig. 3 is a section, on a larger scale and partly broken away, showing a part of the structure illustrated in Fig. 2; and Fig. 4 is a fragmentary section similar to Fig. 3, showing a modified form of construction.

Referring now to Figs. 1 to 3, the bearing comprises an inner bearing member 1 and an outer bearing member 2, radially spaced therefrom, there being radially positioned between these members a plurality of bearing blocks 3. In the specific form of bearing illustrated, the member 1 is the driving member and is in the form of a ring secured to a rotatably mounted shaft 4, while the member 2 is in the form of a bearing race adapted to be secured in a housing or like structure. It will be understood, however, that insofar as the present invention is concerned, these members need not necessarily be separate elements, but that member 1, for example, may be made as an integral part of shaft 4 and member 2 as an integral part of the member supporting the bearing.

The inner bearing member 1 is provided with a plurality of axial grooves 5, the shoulders at the sides of each groove forming radial load carrying bearing surfaces $a$ and $b$ for the bearing blocks 3, the latter being provided on their radially inner sides with axially extending projections 6 forming cooperating bearing surfaces $c$ and $d$. The radially outer sides of the blocks 3 provide extended bearing surfaces adapted to slide with respect to the inner surface 7 of the outer member 2, the tilting of the blocks providing space for a wedge-shaped load sustaining film of lubricant between the blocks and the outer bearing member.

The surface 7 and the cooperating surfaces of the blocks are preferably spherically curved to permit the bearing to automatically align itself. The blocks are held against axial movement with respect to the inner member 1 by segmental peripheral projections 8 on the inner member, these projections entering suitable peripheral grooves 9 in the bearing blocks.

Abutments on the inner or driving member 1 are formed by projections 10, these projections extending axially of the bearing and projecting radially outward beyond the projections 8. The bearing blocks are located between projections 10 and have a certain limited peripheral movement between the abutment surfaces 11 and 11' on projections 10. Each of the bearing blocks is formed with axially extending surfaces 12 and 12', one or the other of these surfaces being adapted to contact a surface 11 or 11' respectively.

The general construction above described is similar to the form of bearing described in the aforesaid patent of August G. F. Wallgren, to which reference may be had for a more detailed description of the general character of the bearing and its method of operation.

Upon rotation of the bearing in the direction of the arrow shown in Fig. 3, the bearing blocks assume a tilted position in which the radial load carrying bearing surfaces $a$ and $c$ are in contact, with each of the bearing blocks tilted to form a wedge-shaped lubricant receiving space 13 between the block and the outer bearing member.

In the position of the parts shown in Fig. 3 the abutment surfaces 11' and 12' are in contact to cause the bearing blocks to rotate with the inner or driving member. Upon reversal of the direction of rotation each of the bearing blocks shifts to a position opposite that shown in Fig. 3 so that bearing surfaces $b$ and $d$ and abutment surfaces 11 and 12 are in contact, with the block tilted to form a wedge-shaped spaced opening in a direction opposite that shown in the figure.

As will be noted from the figures, the area of contact between bearing surfaces $a$ and $c$ or surfaces $b$ and $d$, as the case may be, is comparatively small and the unit pressure on these surfaces is accordingly relatively high. From this it follows that no sliding motion between these surfaces, or as little sliding motion as possible, is desirable when the bearing is operating under load, in order to minimize wear. Obviously, sliding motion between these surfaces must occur when the blocks shift their positions peripherally upon change in the direction of rotation of the bearing, but this shifting movement of the blocks occurs only when the blocks are in a non-load supporting zone in their path of rotation and is of no consequence from the standpoint of wear. The relative movement between these surfaces which must be considered is that due to change in the angle of tilt of the blocks caused by variation in the load thereon when the bearing is in operation.

In accordance with the present invention undesirable wear on the bearing surfaces is minimized or eliminated by making the contour and position of the abutment surfaces such that the distance from points of contact between the abutment surfaces to the points of contact between the radial load carrying bearing surfaces is substantially constant regardless of the angle of tilt of the blocks within the range of their tilting movement.

Preferably the abutment surfaces 11 and 11' and the cooperating surfaces 12 and 12' on the bearing blocks are formed as the arcs of circles the centers of which are located at the points of contact between the cooperating radial load carrying bearing surfaces. This form of construction is illustrated in Fig. 3, and it will be evident from an inspection of the drawing that the block shown therein may tilt or rock about the contacting bearing surfaces as a pivot point without there being peripheral movement of the block with respect to the inner bearing member caused by radial movement of surface 12' with respect to surface 11'.

While the arcuate form of abutment surface is productive of the most desirable results, elimination of relative peripheral movement between the radial load carrying bearing surfaces with resultant elimination of appreciable wear may be secured by other forms of abutment surfaces. The essential requisite is that the radially innermost and the radially outermost points of contact between the bearing blocks and the projections forming the abutments be substantially the same distance from the contact points between the bearing surfaces carrying the radial load, throughout the range of tilting movement of the bearing blocks. This essential may be obtained with a variety of forms of abutment surface, provided each abutment surface, for example a surface 11', is approximately symmetrical with respect to an axial plane passing through the central portion of said surface and the adjacent bearing surface $a$, with the cooperating surface 12' on the block similarly symmetrical about a plane passing through its central portion and bearing surface $c$.

In Fig. 4 a modified form of bearing is shown in which the abutment surface 11' is in the form of an axially disposed plane, the position of the plane being such that a line drawn normal to the surface of the central part of the plane passes through the adjacent bearing surface a.

From the foregoing description it will be evident that the invention is not limited to the specific forms herein illustrated, but may include numerous variations within its scope.

What I claim is:

1. A bearing of the radial type comprising an inner member, an outer member radially spaced from the inner member, one of said members constituting a driving member, a bearing block having operative positions radially between said members, the driving member and said block having cooperating bearing surfaces for transmitting radial load, said surfaces being located to permit tilting of the block upon rotation, and a projection on the driving member having a surface forming an abutment for causing rotation of the block with the driving member, the abutment surface being positioned so that a line generally normal to the central part of said abutment surface passes through the adjacent bearing surface on the driving member.

2. A bearing of the radial type comprising an inner member, an outer member radially spaced from the inner member, one of said members constituting a driving member, a bearing block having operative positions radially between said members, the driving member and said block having cooperating bearing surfaces for transmitting radial load, said surfaces being located to permit tilting of the block upon rotation, and a projection on the driving member having an axially straight surface forming an abutment for causing rotation of the block with the driving member, the abutment surface being curved about a focal point located on a line in the plane of the bearing and passing through the central part of the abutment surface and the adjacent bearing surface on the driving member.

3. A bearing of the radial type comprising an inner member, an outer member radially spaced from the inner member, one of said members constituting a driving member, a bearing block having operative positions radially between said members, the driving member and said block having cooperating bearing surfaces for transmitting radial load, said surfaces being located to permit tilting of the block upon rotation, and a projection on the driving member having a surface forming an abutment for causing rotation of the block with the driving member, the abutment surface being an arc struck about the adjacent bearing surface of the driving member as a center.

4. A bearing of the radial type comprising an inner member, an outer member radially spaced from the inner member, one of said members constituting a driving member, a bearing block having operative positions radially between said members, the driving member and said block having cooperating bearing surfaces for transmitting radial load, said surfaces being located to permit tilting of the block upon rotation, and a projection on the driving member having a surface forming an abutment for causing rotation of the block with the driving member, the abutment surface being a plane positioned so that a line substantially normal to the central part of the abutment surface passes through the adjacent bearing surface on the driving member.

5. A bearing of the radial type comprising an inner member, an outer member radially spaced from the inner member, one of said members constituting a driving member, a bearing block having operative positions radially between said members, the driving member and said block having cooperating bearing surfaces for transmitting radial load, said surfaces being located to permit tilting of the block upon rotation, and a projection on the driving member having a surface forming an abutment for causing rotation of the block with the driving member, the abutment surface being symmetrical with respect to a plane parallel to the axis of the bearing and passing through the radially central part of the abutment surface and the adjacent bearing surface on the driving member.

6. A bearing of the radial type comprising an inner member, an outer member radially spaced from the inner member, one of said members constituting a driving member, a bearing block having operative positions radially between said members, the driving member and said block having cooperating bearing surfaces for transmitting radial load, said surfaces being located to permit tilting of the block upon rotation, and a projection on the driving member having a surface forming an abutment for causing rotation of the block with the driving member, the contour and position of said last-mentioned surface being such that the distance, in the plane of the bearing, from the bearing surface on the driving member to a point of contact between the block and the abutment surface is substantially constant throughout the range of tilting movement of the block.

7. A bearing of the radial type comprising an inner member, a stationary outer member radially spaced from the inner member, one of said members constituting a driving member, a plurality of bearing blocks having operative positions radially between said members, said blocks and the driving member having cooperating bearing surfaces for causing rotation in one direction to tilt the blocks one way and rotation in the other direction to tilt the blocks the other way, and a plurality of projections on the driving member having surfaces forming abutments for causing rotation of the blocks with the driving member, the contours and positions of said abutment surfaces being such that the distance from a point of contact between any abutment surface and its adjacent block to the adjacent bearing surface of the driving member is substantially constant throughout the range of tilting movement of the block.

8. A bearing of the radial type comprising an inner member, an outer member spaced radially therefrom, a bearing block having operative positions radially between said members, the inner member and the block having cooperating bearing surfaces for causing tilting of the block upon rotation of the inner member, and cooperating abutment surfaces on the inner member and the block for causing rotation of the block with the inner member, the contours and positions of said abutment surfaces being such that the distance, in the plane of the bearing, from a point of contact between the abutment surfaces to a point of contact between the adjacent bearing surfaces is substantially constant throughout the range of tilting movement of the block.

9. In a radial bearing of the sliding block type, a driving member having an axial groove providing shoulders adjacent to the sides of the groove, said shoulders forming bearing surfaces for transmitting radial load to the bearing blocks, and radially extending projections peripherally spaced on either side of said groove, each of said projections having an axially extending abutment surface for driving a block peripherally, said surface being substantially symmetrical with respect to a plane parallel to the axis of the bearing and passing through the central part of the abutment surface and the adjacent bearing surface.

10. In a radial bearing of the sliding block type, a driving member having an axial groove providing shoulders adjacent to the sides of the groove, said shoulders forming bearing surfaces for transmitting radial load to the bearing blocks, and radially extending projections peripherally spaced on either side of said groove, each of said projections having an axially extending abutment surface for driving a block peripherally, said surface being cylindrically curved about an axial line on an adjacent bearing surface.

11. A bearing comprising a first member and a second member, a bearing block having operative positions between said members, one of said members and said block having cooperating load transmitting bearing surfaces for tilting the block upon relative movement between said members, and means providing an abutment surface on said one of said members cooperating with said block to limit the movement of the block in one direction relative to said member, said abutment surface being positioned so that a line generally normal to the central part of the abutment surface passes through the adjacent bearing surface on the said member.

12. A bearing comprising a first member and a second member, a bearing block having operative positions between said members, one of said members and said block having cooperating load transmitting bearing surfaces for tilting the block upon relative movement between said members, and means providing an abutment surface on said one of said members cooperating with said block to limit the movement of the block in one direction relative to said member, said abutent surface comprising an arc struck about the adjacent bearing surface of the said member as a center.

13. A bearing comprising a first member and a second member, a bearing block having operative positions between said members, one of said members and said block having cooperating load transmitting bearing surfaces for tilting the block upon relative movement between said members, and means providing an abutment surface on said one of said members cooperating with said block to limit the movement of the block in one direction relative to said member, said abutment surface being a plane positioned so that a line substantially normal to the central part of the abutment surface passes through the adjacent bearing surface on the said member.

14. A bearing comprising a first member and a second member, a bearing block having operative positions between said members, one of said members and said block having cooperating load transmitting bearing surfaces for tilting the block upon relative movement between said members, and means providing an abutment surface on said one of said members cooperating with said block to limit the movement of the block in one direction relative to said member, said abutment surface being symmetrical with respect to a plane normal to the direction of tilt of the block and passing through the central part of the abutment surface and the adjacent bearing surface on the said member.

15. A bearing comprising a first member and a second member, a bearing block having operative positions between said members, one of said members and said block having cooperating load transmitting bearing surfaces for tilting the block upon relative movement between said members, and means providing an abutment surface on said one of said members cooperating with said block to limit the movement of the block in one direction relative to said member, the contour and position of said abutment surface being such that the distance from the bearing surface on the said member to a point of contact between the block and the abutment surface is substantially constant through the range of tilting movement of the block.

16. A bearing comprising a first member and a second member, a bearing block having operative positions between said members, one of said members and said block having cooperating load transmitting bearing surfaces for tilting the block upon relative movement between said members, and means providing an abutment surface on said one of said members cooperating with said block to limit the movement of the block in one direction relative to said member, the contour and position of said abutment surface being such that the distance from a point of contact between the abutment surface and the block to a point of contact between the adjacent cooperating bearing surfaces is substantially constant through the range of tilting movement of the block.

17. A bearing of the radial type comprising an inner member, an outer member radially spaced from the inner member, and a plurality of bearing blocks having operative positions radially between said members, one of said members having a plurality of axial grooves therein to form a plurality of bearing shoulders adjacent to the edges of the grooves, said blocks having bearing surfaces cooperating with said shoulders to tilt the blocks on rotation, and means for holding the blocks in cooperative relation with the bearing shoulders and for maintaining substantially constant radiant alignment of said bearing shoulders and said bearing surfaces for different angles of tilt comprising projections on one of said members having non-radial abutment surfaces.

18. A bearing comprising spaced relatively movable bearing members, a bearing block therebetween, one of said members being grooved to form a bearing shoulder, said block having a bearing surface cooperating with said shoulder to tilt the block, and means for holding the block in cooperative relation to said shoulder and for maintaining substantially constant alignment of the bearing shoulder and the bearing surface transverse to the general direction of movement for different angles of tilt comprising a projection on one of said members having an abutment surface oblique to the general direction of movement.

In testimony whereof I have affixed my signature.

CARL GUSTAF JANSON.